(12) United States Patent
Miyaguchi et al.

(10) Patent No.: US 9,127,133 B2
(45) Date of Patent: *Sep. 8, 2015

(54) POLYPROPYLENE-BASED RESIN COMPOSITION AND FILM

(75) Inventors: Yukito Miyaguchi, Sodegaura (JP); Hideaki Hori, Sodegaura (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 12/466,496

(22) Filed: May 15, 2009

(65) Prior Publication Data

US 2009/0292076 A1    Nov. 26, 2009

(30) Foreign Application Priority Data

May 23, 2008    (JP) ................. 2008-135286

(51) Int. Cl.
  *C08L 23/00* (2006.01)
  *C08J 5/18* (2006.01)
  *C08L 23/14* (2006.01)

(52) U.S. Cl.
  CPC .......... *C08J 5/18* (2013.01); *C08L 23/142* (2013.01); *C08J 2323/14* (2013.01); *C08L 2205/02* (2013.01)

(58) Field of Classification Search
  CPC ......... C08L 23/14; C08L 23/142; C08J 5/18
  USPC ................................. 525/240, 191
  See application file for complete search history.

(56) References Cited

U.S. PATENT DOCUMENTS

| | | | |
|---|---|---|---|
| 4,186,240 A * | 1/1980 | Matsuda et al. | 428/349 |
| 4,822,840 A | 4/1989 | Kioka et al. | |
| 4,894,421 A | 1/1990 | Kioka et al. | |
| 5,998,039 A * | 12/1999 | Tanizaki et al. | 428/516 |
| 7,015,287 B2 * | 3/2006 | Deblauwe et al. | 525/191 |
| 2003/0220453 A1 * | 11/2003 | Ebara et al. | 525/191 |
| 2006/0276607 A1 * | 12/2006 | Ikenaga et al. | 526/348.6 |
| 2008/0015312 A1 * | 1/2008 | Hori et al. | 525/191 |
| 2009/0092847 A1 * | 4/2009 | Onoe et al. | 428/500 |
| 2009/0292077 A1 * | 11/2009 | Miyaguchi et al. | 525/240 |

FOREIGN PATENT DOCUMENTS

| | | |
|---|---|---|
| JP | 64-018633 A | 1/1989 |
| JP | 2004-249568 | 9/2004 |
| JP | 2007-136783 A | 6/2007 |

OTHER PUBLICATIONS

Office Action issued on Aug. 14, 2012 for corresponding Chinese Patent Application No. 200910149730.7.
Office Action issued on Jan. 10, 2012, in corresponding Japanese Patent Application No. 2008-135286.

* cited by examiner

*Primary Examiner* — Irina Krylova
(74) *Attorney, Agent, or Firm* — Sughrue Mion, PLLC

(57) ABSTRACT

A polypropylene-based resin composition comprising 61 to 85% by weight of a copolymer (X) of propylene, α-olefin having 4 or more of carbon atoms and/or ethylene, in which a content of a constitutional unit derived from propylene is 86 to 97% by weight, a total of a content of a constitutional unit derived from ethylene and a content of a constitutional unit derived from α-olefin having 4 or more of carbon atoms is 3 to 14% by weight, provided that a total of the content of a constitutional unit derived from propylene, the content of a constitutional unit derived from ethylene and the content of a constitutional unit derived from α-olefin having 4 or more of carbon atoms is defined to be 100% by weight, 1 to 38% by weight of a copolymer (Y) of propylene and α-olefin having 4 or more of carbon atoms, in which a melting point is 115° C. or more, and a content of a constitutional unit derived from α-olefin having 4 or more of carbon atoms is 10 to 30% by weight, and 1 to 38% by weight of a copolymer (Z) of propylene and α-olefin having 4 or more of carbon atoms, in which a melting point is less than 115° C., and a content of a constitutional unit derived from α-olefin having 4 or more of carbon atoms is 30 to 40% by weight, wherein a total of the copolymer (X), the copolymer (Y) and the copolymer (Z) is defined to be 100% by weight.

4 Claims, No Drawings

POLYPROPYLENE-BASED RESIN COMPOSITION AND FILM

TECHNICAL FIELD

The present invention relates to a polypropylene-based resin composition containing a copolymer (X) of propylene, α-olefin and/or ethylene, a copolymer (Y) of propylene and α-olefin, and a copolymer (Z) of propylene and α-olefin, and a film thereof.

BACKGROUND ART

In recent years, a packaging speed has increased in a food-packaging field, etc. Therefore, as films for packaging, films that has low temperature heat sealing properties and also do not break even if contents are filled immediately after packaging, that is, films excellent in hot tack characteristics (hot tack strength) are required. Further, films for packaging are also required to have blocking resistance.

As compositions from which a film excellent in low heat sealing properties and blocking resistance can be obtained, for example, Japanese Patent Application Laid-Open No. 2004-002760 discloses a composition containing 10 to 99% by weight of a copolymer of propylene and α-olefin, 0 to 60% by weight of a copolymer of propylene, and α-olefin and/or ethylene, and 1 to 30% by weight of a crystalline olefin-based copolymer having a melting point of 115° C. or less.

[Patent Document 1] Japanese Patent Application Laid-Open No. 2004-002760

DISCLOSURE OF THE INVENTION

Problems to be Solved by the Invention

In view of the above described circumstances, an object of the present invention is to provide a polypropylene-based resin composition from which a film excellent in a balance of low temperature heat sealing properties, hot tack characteristics (hot tack strength), and blocking resistance can be obtained, and a film.

Means for Solving the Problems

The present invention relates to a polypropylene-based resin composition comprising 61 to 85% by weight of a copolymer (X) of propylene, α-olefin having 4 or more of carbon atoms and/or ethylene, in which a content of a constitutional unit derived from propylene is 86 to 97% by weight, a total of a content of a constitutional unit derived from ethylene and a content of a constitutional unit derived from α-olefin having 4 or more of carbon atoms is 3 to 14% by weight, provided that a total of the content of a constitutional unit derived from propylene, the content of a constitutional unit derived from ethylene and the content of a constitutional unit derived from α-olefin having 4 or more of carbon atoms is defined to be 100% by weight, 1 to 38% by weight of a copolymer (Y) of propylene and α-olefin having 4 or more of carbon atoms, in which a melting point is 115° C. or more, and a content of a constitutional unit derived from α-olefin having 4 or more of carbon atoms is 10 to 30% by weight, and 1 to 38% by weight of a copolymer (Z) of propylene and α-olefin having 4 or more of carbon atoms, in which a melting point is less than 115° C., and a content of a constitutional unit derived from α-olefin having 4 or more of carbon atoms is 30 to 40% by weight, wherein a total of the copolymer (X), the copolymer (Y) and the copolymer (Z) is defined to be 100% by weight.

Hereinafter, "α-olefin having 4 or more of carbon atoms" is also simply referred to as "α-olefin" in the present specification.

Effects of the Invention

According to the present invention, a polypropylene-based resin composition from which a film excellent in a balance of low temperature heat sealing properties, hot tack characteristics (hot tack strength), and blocking resistance can be obtained, and a film can be obtained.

BEST MODE FOR CARRYING OUT THE INVENTION (1) Copolymer (X) of Propylene, α-Olefin and/or Ethylene In a copolymer (X) of propylene, α-olefin and/or ethylene (hereinafter, also simply referred to as a copolymer (X)), a content of a constitutional unit derived from propylene is 86 to 97% by weight, preferably 88 to 97% by weight, and more preferably 88 to 96% by weight. When the content is more than 97% by weight, a heat sealing temperature of an obtained film may be high in some cases, and when the content is less than 86% by weight, blocking resistance of an obtained film may deteriorate in some cases. When the copolymer (X) is composed only of a constitutional unit derived from propylene and a constitutional unit derived from ethylene, a content of the constitutional unit derived from ethylene is 3 to 14% by weight, preferably 3 to 12% by weight, and more preferably 4 to 12% by weight. When the copolymer (X) is composed of a constitutional unit derived from propylene, a constitutional unit derived from ethylene, and a constitutional unit derived from α-olefin having 4 or more of carbon atoms, a content of the constitutional unit derived from ethylene is preferably 1 to 13% by weight, and more preferably 2 to 11% by weight, and a content of constitutional unit derived from α-olefin having 4 or more of carbon atoms is preferably 1 to 13% by weight, and more preferably 2 to 11% by weight (herein a total of the content of a constitutional unit derived from propylene, the content of a constitutional unit derived from ethylene and the content of a constitutional unit derived from α-olefin is defined to be 100% by weight). The copolymer (X) is preferably a crystalline propylene-ethylene random copolymer, or a propylene-ethylene-butene random terpolymer, and more preferably a crystalline propylene-ethylene random copolymer.

A melt flow rate (MFR) of the copolymer (X) measured at 230° C. is not particularly limited, and preferably 1 to 20 g/10 minutes, and more preferably 1 to 15 g/10 minutes.

A melting point of the copolymer (X) is preferably 120 to 150° C., and more preferably 125 to 145° C.

Examples of a polymerization catalyst of the copolymer (X) include a Ti—Mg based catalyst made of a solid catalyst component obtained by compounding a Ti compound with a Mg compound, a catalyst combining the solid catalyst component with an organic aluminum compound and an electron donating compound as a third component if needed, a metallocene-based catalyst, and a Brookhart catalyst. Particularly, a Ti—Mg based catalyst made of a solid catalyst component obtained by compounding a Ti compound with a Mg compound is preferable.

Examples of a solid catalyst component include catalysts disclosed in Japanese Patent Application Laid-Open (JP-A) No. 61-218606, JP-A No. 61-287904, and JP-A No.

7-216017. As an organic aluminum compound, triethyl aluminum, triisobutyl aluminum, a mixture of triethyl aluminum and diethyl aluminum chloride, tetraethyl dialmoxane, and the like are preferable. As an electron donating compound, tert-butyl-n-propyldimethoxysilane, tert-butylethyldimethoxysilane, dicyclopentyldimethoxysilane, cyclohexylethyldimethoxysilane, and the like are preferable.

Examples of a metallocene-based catalyst include catalysts disclosed in JP-A No. 8-208909, JP-A No. 2002-105116, and JP-A No. 2003-105017.

Examples of a production method of the copolymer (X) include a solvent polymerization method of polymerizing propylene, and α-olefin and/or ethylene in the presence of a catalyst in an inert solvent such as carbon hydrides such as hexane, heptane, octane, decane, cyclohexane, methylcyclohexane, benzene, toluene, or xylene, a mass polymerization method of polymerizing liquid propylene, liquid α-olefin and/or ethylene in the presence of a catalyst, and a gas phase polymerization method of polymerizing gaseous propylene, gaseous α-olefin and/or ethylene in the presence of a catalyst.

(2) Copolymer (Y) of Propylene and α-Olefin

In the copolymer (Y) of propylene and α-olefin (hereinafter, also simply referred to as the copolymer (Y)), a content of a constitutional unit derived from α-olefin having 4 or more carbon atoms is 10 to 30% by weight, preferably 15 to 30% by weight, and more preferably 20 to 30% by weight. When the content is less than 10% by weight, hot tack characteristics (hot tack strength) of an obtained film may be lowered, and when the content is more than 30% by weight, blocking resistance of an obtained film may deteriorate. α-olefin having 4 or more carbon atoms is preferably 1-butene. A melting point of the copolymer (Y) is 115° C. or more, preferably 120° C. or more, and more preferably 125° C. or more. When the melting point is less than 115° C., blocking resistance of an obtained film may deteriorate.

A melt flow rate (MFR) of the copolymer (Y) measured at 230° C. is not particularly limited, and is preferably 1 to 20 g/10 minutes, and more preferably 1 to 15 g/10 minutes.

Examples of a polymerization catalyst of the copolymer (Y) include a Ti—Mg based catalyst made of a solid catalyst component obtained by compounding a Ti compound with a Mg compound, a catalyst combining the solid catalyst component with an organic aluminum compound and an electron donating compound as a third component if needed, a metallocene-based catalyst, and a Brookhart catalyst. Particularly, a Ti—Mg based catalyst made of a solid catalyst component obtained by compounding a Ti compound with a Mg compound is preferable.

Examples of a production method of the copolymer (Y) include a solvent polymerization method of using an inert solvent such as carbon hydrides such as hexane, heptane, octane, decane, cyclohexane, methylcyclohexane, benzene, toluene, or xylene, a mass polymerization method of using a liquid monomer as a solvent, and a gas phase polymerization method carried out in a gaseous monomer.

(3) Copolymer (Z) of Propylene and α-Olefin

In the copolymer (Z) of propylene and α-olefin (hereinafter, also simply referred to as the copolymer (Z)), a content of a constitutional unit derived from α-olefin having 4 or more carbon atoms is 30 to 40% by weight, and preferably 30 to 35% by weight. When the content is less than 30% by weight, a heat sealing temperature of an obtained film may increase, and when the content is more than 40% by weight, blocking resistance of an obtained film may deteriorate. A melting point of the copolymer (Z) is less than 115° C., preferably 105° C. or less, and more preferably 95° C. or less. When the melting point is more than 115° C., a heat sealing temperature of an obtained film may increase.

A melt flow rate (MFR) of the copolymer (Z) measured at 230° C. is preferably 1 to 20 g/10 minutes, and more preferably 1 to 15 g/10 minutes.

Examples of a polymerization catalyst of the copolymer (Z) include a Ti—Mg based catalyst made of a solid catalyst component obtained by compounding a Ti compound with a Mg compound, a catalyst combining the solid catalyst component with an organic aluminum compound and an electron donating compound as a third component if needed, a metallocene-based catalyst, and a Brookhart catalyst. Particularly, a metallocene-based catalyst is preferable.

Examples of a production method of the copolymer (Z) include a solvent polymerization method of using an inert solvent such as carbon hydrides such as hexane, heptane, octane, decane, cyclohexane, methylcyclohexane, benzene, toluene, or xylene, a mass polymerization method of using a liquid monomer as a solvent, and a gas phase polymerization method carried out in a gaseous monomer.

The polypropylene-based resin composition of the present invention contains 61 to 85% by weight of the copolymer (X) of propylene, and α-olefin and/or ethylene, 1 to 38% by weight of the copolymer (Y) of propylene and α-olefin, and 1 to 38% by weight of the copolymer (Z) of propylene and α-olefin. The polypropylene-based resin composition of the present invention preferably contains 61 to 85% by weight of the copolymer (X) of propylene, and α-olefin and/or ethylene, 5 to 34% by weight of the copolymer (Y) of propylene and α-olefin, and 5 to 34% by weight of the copolymer (Z) of propylene and α-olefin. Provided that, a total of contents of the copolymer (X), the copolymer (Y) and the copolymer (Z) is defined to be 100% by weight.

The polypropylene-based resin composition of the present invention may contain additives, other resins, and the like if needed.

Examples of the additives include an antioxidant, an ultraviolet absorber, an anti-static agent, a lubricant, a nucleating agent, an anti-fogging agent, and anti-blocking agent.

Examples of other resins include a polyethylene-based resin, and polyolefin-based resins other than the copolymers (X), (Y) and (Z).

A film having a layer made of the polypropylene-based resin composition of the present invention can be produced by using the polypropylene-based resin composition of the present invention.

The film of the present invention is a film which has a multilayered structure comprising a layer made of the polypropylene-based resin composition of the present invention and a layer made of a different resin, and is drawn biaxially.

The different resin is not particularly limited, and a generally used resin such as polypropylene can be used.

As a method for producing the film of the present invention, generally used methods such as an inflation method, a T-die method, and a calendaring can be used.

Examples of a drawing method include methods of biaxially drawing by roll draw, tenter draw, tubular draw, and the like.

The film of the present invention can be employed for a laminate film, a barrier film, an aqueous ink printing film, a separating sheet film, surface protective film, a food wrapping film, and the like.

EXAMPLES

The present invention will be more specifically described below using examples and comparative examples. Preparation methods of samples and measurement methods of physical properties used in examples and comparative examples are shown in the following.

(1) Content of Constitutional Unit Derived from Ethylene (Unit: wt %)

The content was measured by an IR spectrum measurement method described in the Polymer Analysis Hand Book (issued by Asakura Publishing Co., Ltd., 1985) on page 256.

(2) Content of Constitutional Unit Derived from 1-Butene (B wt %, Unit: wt %)

The content was calculated as follows using $^{13}$C nuclear magnetic resonance.

<Measurement Conditions>
Device: AVANCE 600 manufactured by Bruker Co.
Measurement probe: 10 mm-cryoprobe
Measurement solvent: mixed solution of 1,2-dichlorobenzene/1,2-dichlorobenzene-d4=75/25 (volume ratio)
Measurement temperature: 130° C.
Measurement method: Proton decoupling method
Pulse width: 45 degree
Pulse repeating time: 4 seconds
Measurement basis: trimethylsilane
Sample concentration: dissolving 300 mg of a polymer based on 3 ml of a measurement solvent
Accumulation number: 256 times <Calculation Method>

When a peak of an integrated intensivity measured at 46.0 to 47.5 ppm was expressed as PP, a peak of an integrated intensivity measured at 43.1 to 44.0 ppm was expressed as PB, and a peak of an integrated intensivity measured at 40.1 to 40.5 ppm was expressed as BB, a butene molar fraction (B mol %) and a propylene molar fraction (P mol %) can be obtained by the following formulas.

$$B\ mol\ \% = 100 \times (BB + 0.5 \times PB)/(BB + PB + PP)$$

$$P\ mol\ \% = 100 - B\ mol\ \%$$

A content of a constitutional unit derived from 1-buten (B wt %) can be measured by the following formula.

$$B\ wt\ \% = 100 \times B\ mol\ \% \times 56/(B\ mol\ \% \times 56 + P\ mol\ \% \times 42)$$

(3) Intrinsic Viscosity ([η], Unit: dl/g)

An intrinsic viscosity was measured in tetralin at 135° C. using an Ubbelohde-type viscometer.

(4) Melt Flow Rate (MFR, Unit: g/10 Minutes)

A melt flow rate was measured at a temperature of 230° C. with a lord of 21.18 N according to JIS K7210.

(5) Melting Point (Tm, Unit: ° C.)

The copolymers (X), (Y) and (Z) were heat press-molded (after preheating at 230° C. for 5 minutes, a pressure was increased to 50 kgf/cm$^2$ over 3 minutes and the pressure was retained for 2 minutes, thereafter cooling at 30° C. and 30 kgf/cm$^2$ for 5 minutes) to form a sheet having a thickness of 0.5 mm. A temperature (° C.) indicating a maximum heat absorption peak was measured by using a differential scanning calorimeter (Diamond DSC, manufactured by PerkinElmer Japan Co., Ltd.) in a melting curve obtained at the time when 10 mg of the formed sheet was heat treated at 220° C. in a nitrogen atmosphere for 5 minutes, then cooled to 150° C. at a temperature decrease rate of 300° C./min and the temperature was retained at 150° C. for 1 minute, further, cooled to 50° C. at a temperature decrease rate of 5° C./min and retained at 50° C. for 1 minute, thereafter heating from 50° C. to 180° C. at a temperature increase rate of 5° C./min.

(6) Transparency (Haze, Unit: %)

Transparency was measured in accordance with JIS K7105.

(7) Heat Sealing Temperature (HST, Unit: ° C.)

Surfaces of films were overlapped each other and pressure-bonded at a load of 2 kgf/cm$^2$ for 2 seconds by a heat sealer (manufactured by Toyo Seiki Seisaku-sho, Ltd.) and heated at a predetermined temperature to be heat sealed, and a sample was thus obtained. Note that an area of sealing was defined to be MD 10 mm×TD 25 mm. This sample was left at 23° C. and a humidity of 50% for day and night, and then a sealing temperature having a pealing resistance of 300 gf/25 mm at the time of peeling at 23° C., a humidity of 50%, a peeling speed of 200 mm/minute, and a peeling angle of 180° was found. This sealing temperature was defined to be a heat sealing temperature.

(8) Blocking (Unit: kgf/12 cm$^2$)

Surfaces to be measured of two films with MD 100 mm×TD 30 mm were overlapped and a spindle having a weight of 500 g was placed on a set area of MD 40 mm×TD 30 mm and heat treated for 3 hours in an oven at 60° C. Then, the films were left at room temperature of 23° C. in an atmosphere at a humidity of 50% for 30 minutes or more, and then a shear peeling strength at a tensile speed of 200 mm/min was measured.

(9) Hot Tack Strength (HT Strength, Unit: gf/inch)

Sealant surfaces of films with 75 mm-width were overlapped and pressure bonded for 2 seconds with a load of 2 kgf/cm$^2$ by a heat sealer heated at 140° C. to be heat sealed. Immediately after removing the load, a peeling strength was added to the sealed portion by a plate-form spring and a peeling length was measured.

The peeling test was repeated with a different peeling strength using a plate-form spring having a different spring constant, and a peeling strength indicating 3.2 mm of a pealing length was found. Note that spring strengths of the used plate-form springs were 53 gf/inch, 77 gf/inch, 110 gf/inch, 154 gf/inch, 224 gf/inch, 250 gf/inch, and 295 gf/inch.

<Powder (X-1)>

A powder (X-1) of a propylene/ethylene copolymer (content of a constitutional unit derived from ethylene=4.4% by weight, Tm=138° C., [η]=1.59 dl/g) was obtained by a method disclosed in Examples of JP-A No. 9-67416.

<Powder (X-2)>

A powder (X-2) of a propylene/ethylene copolymer (content of a constitutional unit derived from ethylene=4.0% by weight, Tm=140° C., [η]=1.70 dl/g) was obtained by a method disclosed in Examples of JP-A No. 9-67416.

<Powder (Y-1)>

A powder (Y-1) of a propylene/1-butene copolymer (content of a constitutional unit derived from 1-butene=22.2% by weight, Tm=126° C., [η]=2.11 dl/g) was obtained by a method disclosed in Examples of JP-A No. 2004-002760.

<Powder Z-1)>

TAFMER XM7070 (made by Mitsui Chemicals, Inc.) (content of a constitutional unit derived from 1-butene=32.1% by weight, Tm=79° C., [η]=1.49 dl/g, MFR=6.8) was used as a powder (Z-1).

Example 1

Mixed were 0.01 part by weight of hydrotalcite (made by Kyowa Chemical Industry Co., Ltd.), 0.15 part by weight of Irganox 1010 (made by Ciba Japan K.K.), 0.10 part by weight of Irgafos 168 (made by Ciba Japan K.K.), 0.40 part by weight of Tospearl 120 (made by Momentive Performance Materials Inc.), and 0.05 part by weight of a MFR regulator based on 100% by weight of a total of 70% by weight of the powder (X-1), 25% by weight of the powder (Y-1), and 5% by weight of the powder (Z-1), and then melt-kneaded to obtain a pellet having a MFR of 7.6 g/10 minutes. For the MFR regulator, a master butch obtained by immersing 2,5-dimethyl-2,5-bis(t-butylperoxy)hexane in a polypropylene powder to be 8% was used.

[Formation of Multilayered Biaxially Drawn Film]

Using the pellet obtained for a surface layer and using FS2016 (made by Sumitomo Chemical Co., Ltd.) (propylene having a melting point of 162° C. and a MFR of 1.9 g/10 minutes) for a substrate layer, the pellet obtained by kneading was melt-kneaded at 230° C. and FS2016 was melt-kneaded at 260° C., respectively by separate extruders and then supplied to a co-extrusion T-die of one device in a co-extrusion pilot tenter (manufactured by Mitsubishi Heavy Industries, Ltd.). A resin extruded from this T-die as a structure of two kinds and two layers, which is a surface layer/substrate layer, was rapidly cooled in a cooling roll at 30° C. to be solidified, and a cast sheet having a thickness of 1 mm was thus obtained.

The obtained cast sheet was drawn by 5 times in the lengthwise direction at a draw temperature of 115° C. by a roll circumferential speed gap of a longitudinal drawing machine after preheating at 120° C., subsequently drawn by 8 times in the traverse direction at a draw temperature of 157° C. in a heating reactor, then a heat treatment was carried out at 165° C. to obtain a multilayered biaxially drawn film having a surface layer thickness/substrate layer thickness=1 μm/20 μm, and the film was wound up by a winder. Physical properties of the obtained multilayered biaxially drawn film were shown in Table 1.

Comparative Example 1

A pellet having a MFR of 7.5 g/10 minutes was obtained by the same method as in Example 1 except for using 70% by weight of the powder (X-1), 30% by weight of the powder (Y-1), and 0.06 part by weight of a MFR regulator, and formation of a multilayered biaxially drawn film was carried out. Evaluation results of physical properties of the obtained multilayered biaxially drawn film were shown in Table 1.

Comparative Example 2

A pellet having a MFR of 7.3 g/10 minutes was obtained by the same method as in Example 1 except for using 70% by weight of the powder (X-1), 30% by weight of the powder (Z-1), and adding no MFR regulator, and formation of a multilayered biaxially drawn film was carried out. Evaluation results of physical properties of the obtained multilayered biaxially drawn film were shown in Table 1.

Example 2

A pellet having a MFR of 7.4 g/10 minutes was obtained by melt kneading in the same method as in Example 1 except for using 80% by weight of the powder (X-1), 15% by weight of the powder (Y-1), 5% by weight of the powder (Z-1), and 0.03 part by weight of a MFR regulator, and formation of a multilayered biaxially drawn film was carried out. Evaluation results of physical properties of the obtained multilayered biaxially drawn film were shown in Table 1.

Comparative Example 3

A pellet having a MFR of 6.2 g/10 minutes was obtained by the same method as in Example 1 except for using 80% by weight of the powder (X-1), 20% by weight of the powder (Y-1), and 0.06 part by weight of a MFR regulator, and formation of a multilayered biaxially drawn film was carried out. Evaluation results of physical properties of the obtained multilayered biaxially drawn film were shown in Table 1.

Comparative Example 4

A pellet having a MFR of 7.0 g/10 minutes was obtained by the same method as in Example 1 except for using 80% by weight of the powder (X-1), 20% by weight of the powder (Z-1), and adding no MFR regulator, and formation of a multilayered biaxially drawn film was carried out. Evaluation results of physical properties of the obtained multilayered biaxially drawn film were shown in Table 1.

Example 3

A pellet having a MFR of 7.6 g/10 minutes was obtained by the same method as in Example 1 except for using 65% by weight of the powder (X-1), 25% by weight of the powder (Y-1), 10% by weight of the powder (Z-1), and 0.05 part by weight of a MFR regulator, and formation of a multilayered biaxially drawn film was carried out. Evaluation results of physical properties of the obtained multilayered biaxially drawn film were shown in Table 1.

Comparative Example 5

A pellet having a MFR of 7.8 g/10 minutes was obtained by the same method as in Example 1 except for using 65% by weight of the powder (X-1), 35% by weight of the powder (Y-1), and 0.07 part by weight of a MFR regulator, and formation of a multilayered biaxially drawn film was carried out. Evaluation results of physical properties of the obtained multilayered biaxially drawn film were shown in Table 1.

Comparative Example 6

A pellet having a MFR of 7.7 g/10 minutes was obtained by the same method as in Example 1 except for using 65% by weight of the powder (X-1), 35% by weight of the powder (Z-1), and 0.02 part by weight of a MFR regulator, and formation of a multilayered biaxially drawn film was carried out. Evaluation results of physical properties of the obtained multilayered biaxially drawn film were shown in Table 1.

Comparative Example 7

A pellet having a MFR of 7.9 g/10 minutes was obtained by the same method as in Example 1 except for using 55% by weight of the powder (X-1), 35% by weight of the powder (Y-1), 10% by weight of the powder (Z-1), and 0.06 part by weight of a MFR regulator, and formation of a multilayered biaxially drawn film was carried out. Evaluation results of physical properties of the obtained multilayered biaxially drawn film were shown in Table 1.

Comparative Example 8

A pellet having a MFR of 7.1 g/10 minutes was obtained by the same method as in Example 1 except for using 25% by weight of the powder (X-1), 65% by weight of the powder (Y-1), 10% by weight of the powder (Z-1), and 0.10 part by weight of a MFR regulator, and formation of a multilayered biaxially drawn film was carried out. Evaluation results of physical properties of the obtained multilayered biaxially drawn film were shown in Table 1.

Example 4

A pellet having a MFR of 6.8 g/10 minutes was obtained by the same method as in Example 1 except for using 70% by weight of the powder (X-2), 20% by weight of the powder (Y-1), 10% by weight of the powder (Z-1), and 0.06 part by weight of a MFR regulator, and formation of a multilayered biaxially drawn film was carried out. Evaluation results of physical properties of the obtained multilayered biaxially drawn film were shown in Table 1.

Comparative Example 9

A pellet having a MFR of 6.0 g/10 minutes was obtained by the same method as in Example 1 except for using 70% by weight of the powder (X-2), 30% by weight of the powder (Y-1), and 0.06 part by weight of a MFR regulator, and formation of a multilayered biaxially drawn film was carried out. Evaluation results of physical properties of the obtained multilayered biaxially drawn film were shown in Table 1.

Comparative Example 10

A pellet having a MFR of 6.3 g/10 minutes was obtained by the same method as in Example 1 except for using 70% by weight of the powder (X-2), 30% by weight of the powder (Z-1), and 0.02 part by weight of a MFR regulator, and formation of a multilayered biaxially drawn film was carried out. Evaluation results of physical properties of the obtained multilayered biaxially drawn film were shown in Table 1.

The multilayered biaxially drawn films of Examples satisfy all of the criteria of a heat sealing temperature of 100° C. or less, a hot tack strength at 140° C. of 100 gf/inch or more, and a blocking of 0.25 kgf/12 cm$^2$ or less, and are excellent in total balance.

On the other hand, the multilayered biaxially drawn films of comparative examples do not satisfy any of the criteria of a heat sealing temperature of 100° C. or less, a hot tack strength at 140° C. of 100 gf/inch or more, and a blocking of 0.25 kgf/12 cm$^2$ or less. Specifically, in Comparative Example 1, a heat sealing temperature exceeds 100° C. In Comparative Example 2, a blocking exceeds 0.25 kgf/12 cm$^2$ and a hot tack strength is less than 100 gf/inch. In Comparative Example 3, a heat sealing temperature exceeds 100° C. In Comparative Example 4, a blocking exceeds 0.25 kgf/12 cm$^2$ and a hot tack strength is less than 100 gf/inch. In Comparative Example 5, a heat sealing temperature exceeds 100° C. In Comparative Example 6, a blocking exceeds 0.25 kgf/12 cm$^2$ and a hot tack strength is less than 100 gf/inch. In Comparative Example 7, a blocking exceeds 0.25 kgf/12 cm$^2$. In Comparative Example 8, a blocking exceeds 0.25 kgf/12 cm$^2$. In Comparative Example 9, a heat sealing temperature exceeds 100° C. In Comparative Example 10, a blocking exceeds 0.25 kgf/12 cm$^2$ and a hot tack strength is less than 100 gf/inch.

Accordingly, a film excellent in balance of low temperature heat sealing properties, hot tack characteristics (hot tack strength), and blocking resistance can be obtained by using the polypropylene-based resin composition of the present invention.

TABLE 1

| | Composition | | | | Physical properties | | | | |
| | X | | | | MFR | Haze | Blocking | HST | HT strength |
| | X-1 | X-2 | Y | Z | g/10 min | % | Kgf/12 cm$^2$ | ° C. | gf/inch |
|---|---|---|---|---|---|---|---|---|---|
| Example 1 | 70 | — | 25 | 5 | 7.6 | 1.2 | 0.18 | 99 | 190 |
| Comparative Example 1 | 70 | — | 30 | — | 7.5 | 1.1 | 0.24 | 102 | 212 |
| Comparative Example 2 | 70 | — | — | 30 | 7.3 | 1.1 | 0.44 | 83 | 54 |
| Example 2 | 80 | — | 15 | 5 | 7.4 | 1.1 | 0.17 | 100 | 200 |
| Comparative Example 3 | 80 | — | 20 | — | 6.2 | 1.4 | 0.13 | 107 | 232 |
| Comparative Example 4 | 80 | — | — | 20 | 7.0 | 1.1 | 0.38 | 87 | 97 |
| Example 3 | 65 | — | 25 | 10 | 7.6 | 1.7 | 0.19 | 94 | 163 |
| Comparative Example 5 | 65 | — | 35 | — | 7.8 | 1.7 | 0.19 | 102 | 188 |
| Comparative Example 6 | 65 | — | — | 35 | 7.7 | 1.9 | 0.49 | 81 | <53 |
| Comparative Example 7 | 55 | — | 35 | 10 | 7.9 | 1.7 | 0.27 | 95 | 147 |
| Comparative Example 8 | 25 | — | 65 | 10 | 7.1 | 1.2 | 0.28 | 95 | 164 |
| Example 4 | — | 70 | 20 | 10 | 6.8 | 1.7 | 0.21 | 97 | 170 |
| Comparative Example 9 | — | 70 | 30 | — | 6.0 | 1.4 | 0.13 | 104 | 251 |
| Comparative Example 10 | — | 70 | — | 30 | 6.3 | 1.6 | 0.39 | 84 | 71 |

The invention claimed is:

1. A polypropylene-based resin composition comprising 65 to 80% by weight of a copolymer (X) of propylene and ethylene, in which a content of a constitutional unit derived from propylene is 86 to 97% by weight, and a content of a constitutional unit derived from ethylene is 3 to 14% by weight, provided that a total of the content of a constitutional unit derived from propylene and the content of a constitutional unit derived from ethylene is defined to be 100% by weight, 15-25% by weight of a copolymer (Y) of propylene and α-olefin having 4 or more of carbon atoms, in which a melting point is 120 to 126° C., and a content of a constitutional unit derived from α-olefin having 4 or more of carbon atoms is 15 to 30% by weight, and 5-10% by weight of a copolymer (Z) of propylene and α-olefin having 4 or more of carbon atoms, in which a melting point is 79 to 95° C., and a content of a constitutional unit derived from α-olefin having 4 or more of carbon atoms is 30 to 40% by weight, wherein a total of the copolymer (X), the copolymer (Y) and the copolymer (Z) is defined to be 100% by weight, wherein the copolymer (X) is a crystalline propylene-ethylene random copolymer consisting of units derived from propylene and units derived from ethylene.

2. The polypropylene-based resin composition according to claim 1, wherein the copolymer (Y) of propylene and α-olefin having 4 or more of carbon atoms is a copolymer comprising a constitutional unit derived from 1-butene.

3. The polypropylene-based resin composition according to claim 1 wherein the copolymer (Z) of propylene and α-olefin having 4 or more of carbon atoms is a copolymer comprising a constitutional unit derived from 1-butene.

4. A film having a layer comprising the polypropylene-based resin composition according to claim 1.

* * * * *